(12) United States Patent
Walker et al.

(10) Patent No.: US 11,599,373 B2
(45) Date of Patent: Mar. 7, 2023

(54) VIRTUALIZED HARDWARE AND METHODS FOR LEVERAGING VIRTUALIZED HARDWARE WITH MUNITION SUPPORT SOFTWARE

(71) Applicant: Raytheon Company, Waltham, MA (US)

(72) Inventors: Brad A. Walker, Tucson, AZ (US); Richard D. Egbert, Sahuarita, AZ (US); Frederick K. Jones, Oro Valley, AZ (US); Jonathan Johansen, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 422 days.

(21) Appl. No.: 16/792,783

(22) Filed: Feb. 17, 2020

(65) Prior Publication Data
US 2021/0279086 A1 Sep. 9, 2021

(51) Int. Cl.
*G06F 9/455* (2018.01)
*G06F 9/445* (2018.01)
(Continued)

(52) U.S. Cl.
CPC .......... *G06F 9/455* (2013.01); *G06F 9/44505* (2013.01); *G06F 9/45504* (2013.01);
(Continued)

(58) Field of Classification Search
CPC .. G06F 9/44505; G06F 9/455; G06F 9/45504; G06F 11/1484; G06F 11/261;
(Continued)

(56) References Cited

U.S. PATENT DOCUMENTS 6,945,780 B2 * 9/2005 Perry ............... F41G 7/006
706/45
10,409,632 B2 * 9/2019 Hotra ............... G06F 12/063
(Continued)

FOREIGN PATENT DOCUMENTS

CN 103744419 B 6/2016
CN 106570243 A 4/2017
EP 3382536 A1 10/2018

OTHER PUBLICATIONS

Ewing, "The Advanced Guided Weapon Testbed (AGWT) at the Air Force Research Laboratory Munitions Directorate", 2010, ITEA Journal, pp. 23-33. (Year: 2010).*
(Continued)

*Primary Examiner* — Ted T. Vo

(57) ABSTRACT

An apparatus includes at least one memory configured to store a virtualization associated with a programming and test platform and a munition. The virtualization includes a virtual machine containing first software or firmware instructions associated with the programming and test platform and second software or firmware instructions that control behavior of the programming and test platform relative to the munition. The virtualization also includes a virtual representation of the munition. The virtualization further includes one or more virtual communication channels configured to communicatively couple the virtual machine and the virtual representation of the munition. The apparatus also includes at least one processor configured to execute the virtualization and simulate the programming and test platform and the munition on the apparatus.

20 Claims, 4 Drawing Sheets

(51) Int. Cl.
*G06F 11/14* (2006.01)
*G06F 11/26* (2006.01)
*G06F 11/36* (2006.01)

(52) U.S. Cl.
CPC ........ *G06F 11/1484* (2013.01); *G06F 11/261* (2013.01); *G06F 11/3664* (2013.01); *G06F 11/3692* (2013.01); *G06F 11/3696* (2013.01); *G06F 2201/815* (2013.01)

(58) Field of Classification Search
CPC ............ G06F 11/3664; G06F 11/3692; G06F 11/3696; G06F 2201/815
USPC ...................... 718/1; 717/134, 135, 138, 139
See application file for complete search history.

(56) References Cited

U.S. PATENT DOCUMENTS

| | | | |
|---|---|---|---|
| 11,224,815 B2* | 1/2022 | Fan | ....................... A63F 13/573 |
| 2013/0219221 A1 | 8/2013 | Xue et al. | |
| 2014/0222397 A1 | 8/2014 | Jew et al. | |
| 2016/0188451 A1 | 6/2016 | Xia et al. | |
| 2017/0124812 A1* | 5/2017 | Washington | ........ G07F 17/3269 |

OTHER PUBLICATIONS

NavAir, "Navy Training System Plan for the AN/GYQ-79 Common Munitions BIT Reprogramming Equipment", Nov. 2002, 66 pages.
U.S. Navy, "Chapter 16, Weapons Systems Test Equipment", U.S. Navy Aviation Ordnanceman: Ammunition, Bombs, Fuzes, Mines, Missiles, Pyrotechnics & Aircraft Weapons Systems Test Equipment, Mar. 2016, 21 pages.
Preiss et al., "The Common Munitions BIT Reprogramming Equipment: A Management Update", IEEE Systems Readiness Technology Conference, Sep. 1997, p. 224-232.
International Search Report and Written Opinion of the International Searching Authority in connection with International Patent Application No. PCT/US2020/023207 dated Nov. 13, 2020, 14 pages.

* cited by examiner

VIRTUALIZED HARDWARE AND METHODS FOR LEVERAGING VIRTUALIZED HARDWARE WITH MUNITION SUPPORT SOFTWARE

GOVERNMENT RIGHTS

This invention was made with U.S. government support under contract number N00019-15-C-0121 awarded by the Naval Air Systems Command. The U.S. government may have certain rights in this invention.

TECHNICAL FIELD

This disclosure is generally directed to computing systems. More specifically, this disclosure is directed to virtualized hardware and methods for leveraging the virtualized hardware with munition support software.

BACKGROUND

Munitions, such as missiles or other projectiles, often have on-board computers or other on-board systems that execute software or firmware instructions in order to control the operations of the munitions. For example, missiles often include on-board systems that are used to control the targeting, launch, and flight of the missiles during use. These types of on-board systems typically cannot be programmed or tested using standard laptop computers or other common portable devices. Rather, these types of on-board systems can often only interact with specialized equipment that is designed specifically for use with those on-board systems. One example of this is the Common Munitions BIT/Reprogramming Equipment (CMBRE) system, which represents a portable platform used to reprogram missile software, perform built-in tests (BIT) on missiles, and collect status information from non-volatile memories within missiles.

SUMMARY

This disclosure relates to virtualized hardware and methods for leveraging the virtualized hardware with munition support software.

In a first embodiment, an apparatus includes at least one memory configured to store a virtualization associated with a programming and test platform and a munition. The virtualization includes a virtual machine containing first software or firmware instructions associated with the programming and test platform and second software or firmware instructions that control behavior of the programming and test platform relative to the munition. The virtualization also includes a virtual representation of the munition. The virtualization further includes one or more virtual communication channels configured to communicatively couple the virtual machine and the virtual representation of the munition. The apparatus also includes at least one processor configured to execute the virtualization and simulate the programming and test platform and the munition on the apparatus.

In a second embodiment, a non-transitory computer-readable medium contains instructions that when executed cause at least one processor of a computing device to obtain a virtualization associated with a programming and test platform and a munition. The virtualization includes a virtual machine containing first software or firmware instructions associated with the programming and test platform and second software or firmware instructions that control behavior of the programming and test platform relative to the munition. The virtualization also includes a virtual representation of the munition. The virtualization further includes one or more virtual communication channels configured to communicatively couple the virtual machine and the virtual representation of the munition. The medium also contains instructions that when executed cause the at least one processor to execute the virtualization to simulate the programming and test platform and the munition on the computing device.

In a third embodiment, a method includes obtaining a virtualization associated with a programming and test platform and a munition. The virtualization includes a virtual machine containing first software or firmware instructions associated with the programming and test platform and second software or firmware instructions that control behavior of the programming and test platform relative to the munition. The virtualization also includes a virtual representation of the munition. The virtualization further includes one or more virtual communication channels configured to communicatively couple the virtual machine and the virtual representation of the munition. The method also includes executing the virtualization to simulate the programming and test platform and the munition.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
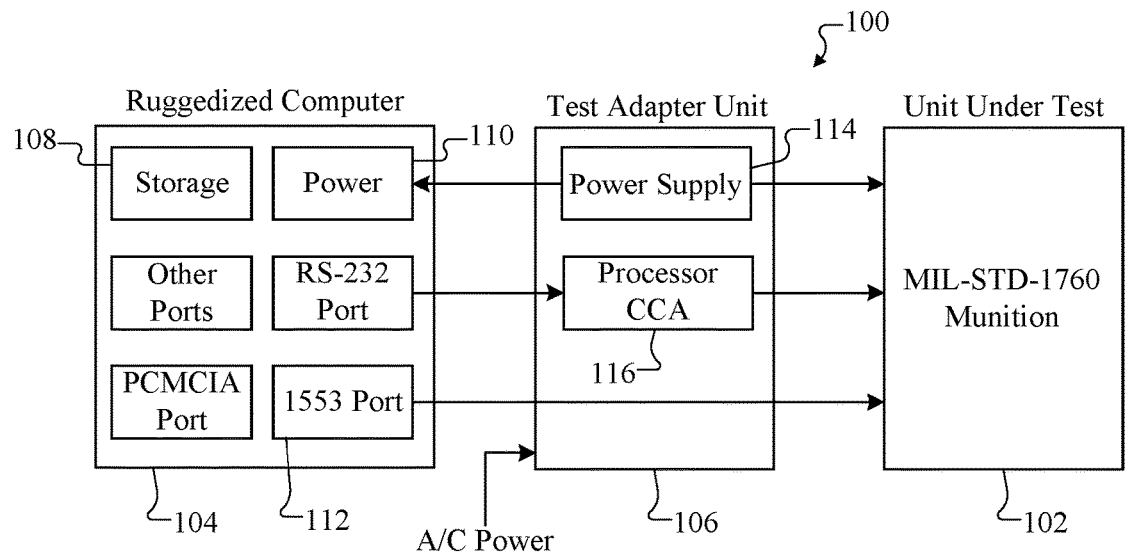
FIGS. 1 and 2 illustrate an example programming and test system used to interact with on-board components of munitions according to this disclosure.

FIGS. 1 through 7, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, munitions often have on-board computers or other on-board systems that execute software or firmware instructions in order to control the operations of the munitions. These types of on-board systems can often only interact with specialized equipment that is designed specifically for use with those on-board systems. One example of this is the Common Munitions BIT/Reprogramming Equipment (CMBRE) system, which represents a portable platform that can be used to reprogram missile software, perform built-in tests (BIT) on missiles, and collect status information from non-volatile memories within missiles.

Unfortunately, this often makes it difficult for developers to test new software for munitions and for personnel to be trained on how to use software for testing and maintaining munitions. For example, CMBRE equipment or other programming/test equipment is often large, cumbersome, and expensive, and developers and trainers routinely do not have access to programming/test equipment for use during testing or training. Also, even if a programming/test platform is available, a munition (or a portion of a munition) is typically needed so that the programming/test platform can be coupled to and interact with the munition, but developers and trainers often do not have access to an actual munition like a missile. Further, users of munition software are often very sensitive to changes in user interfaces for that software, and difficulty in demonstrating a new user interface or new user interface elements may force developers to wait until after munition software is actually developed and provided to end users before receiving feedback (at which point a user interface may require redesign).

Moreover, diagnostic software and built-in tests are often used to test components of munitions, but real munition hardware and real programming/test platform hardware are needed for a full suite of diagnostic tests or built-in tests to be developed and tested. As a result, a munition being developed typically needs to be in a reasonably mature design state in order to develop its diagnostic software and built-in tests, or much of the diagnostic software and built-in tests have to be bypassed during munition development and developed later (either of which can result in significant project delays). In addition, a common problem with developing diagnostic software and built-in tests and with performing software training involves the inability to replicate various error or failure conditions (referred to as faults), such as an intermittent processor shift register failure. Some faults are difficult to induce with real munition hardware or are extremely rare in normal operation of a munition, which can make it difficult or impossible to validate a diagnostic software's ability or a built-in test's ability to detect and handle these faults and to train personnel on how to handle these faults.

This disclosure provides various techniques for virtualizing programming/test platform hardware and optionally virtualizing munition hardware. As described in more detail below, various components of a programming/test platform may be virtualized, and a model or other virtual representation of munition hardware may be created. In some embodiments, for example, munition hardware and programming/test platform hardware (like CMBRE hardware) are virtualized using hardware virtualization software, such as QEMU open-source processor emulation software.

With virtualized emulated hardware, munition software, such as in the form of Computer Software Configuration Items (CSCIs), can be developed and tested with 100% or near 100% hardware fidelity using only a user's personal computer or in some other manner that does not require the programming and test platform and the munition. Thus, for example, a user's computer may execute real-world munition software CSCIs or other munition software on an emulated programming/test platform, possibly using emulated munition hardware. This also enables more advanced software debugging, such as the ability to step forward and step backward in time during both software and hardware emulation, since it is not possible to step backward in time using real hardware. This further allows actual munition software to be used for training purposes, eliminating the need to spend time and money in order to create specialized training versions of the munition software.

In this way, hardware of a munition and a programming/test platform for the munition can be virtualized and used to support various functions, allowing a number of benefits to be obtained depending on the implementation. For example, developers can create and test new software for munitions more easily, and personnel can be trained on how to use software for munitions more easily. As particular examples, this allows much more rapid testing of software for munitions, and this allows end users to be trained in how to use the software and how to perform built-in tests on the munitions. There is little or no reliance on the availability of large, cumbersome, expensive, and scarce programming/test equipment or actual munitions. Also, proposed user interfaces or user interface modifications can be demonstrated easily to potential end users, and feedback can be received during the user interface design process (which may help to reduce or eliminate the need to redesign the user interfaces later). Further, diagnostic software and built-in tests can be developed without requiring the use of an actual programming/test platform and actual munition hardware, which can help to speed up the development process. In addition, various types of faults may be easily simulated using virtualized hardware, making it significantly easier to validate a diagnostic software's ability or a built-in test's ability to detect and handle faults and to train personnel on how to handle faults.

Figure 2:
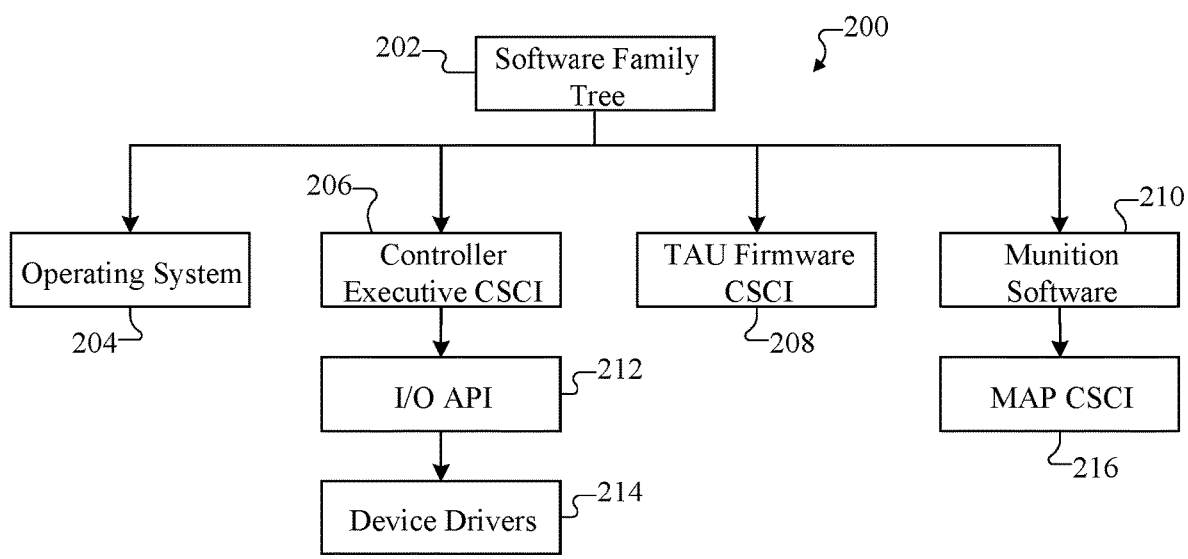

FIGS. 1 and 2 illustrate an example programming and test system used to interact with on-board components of munitions according to this disclosure. In particular, FIG. 1 illustrates an example hardware system 100 and FIG. 2 illustrates an example software system 200, which collectively implement a programming and test platform for munitions. Note that while the programming and test platform shown in FIGS. 1 and 2 may represent the CMBRE platform, other types of programming and test systems may be used to interact with on-board components of munitions, and this disclosure is not limited to any particular programming and test system.

As shown in FIG. 1, the hardware system 100 generally includes various components that are used to interact with a munition 102. The munition 102 represents any suitable type of munition that can interact with an external programming and test system, such as a missile or other projectile. In this particular example, the munition 102 supports interactions with an external programming and test system using a standard interface, such as a MIL-STD-1760 interface, although the munition 102 may support interactions using any other or additional interface(s).

The hardware system 100 in FIG. 1 includes a ruggedized computer 104 and a test adapter unit 106. The ruggedized computer 104 generally represents the component of the programming and test platform that is used by a user and that executes various logic as desired by the user. In this particular example, the ruggedized computer 104 includes a storage 108, a power input 110, and a number of communication ports 112. The storage 108 can be used to store applications or other software instructions to be executed by the hardware system 100. The storage 108 includes any suitable structure configured to store instructions to be executed. In some older programming and test platforms, the storage 108 may represent a floppy disk drive. In other embodiments, other programming and test platforms may use hard drives, Flash drives, optical drives, or any other suitable storage media as the storage 108.

The power input 110 receives operating power for the ruggedized computer 104. The operating power may be used to operate the various components of the ruggedized computer 104. In this example, the power input 110 receives operating power, such as direct current (DC) power, from the test adapter unit 106. However, the power input 110 may receive the operating power from any other suitable source. Also, the power input 110 may be replaced by other components that provide operating power, such as a power supply coupled to an alternating current (AC) input.

The communication ports 112 facilitate communications between the ruggedized computer 104 and various external devices or systems, such as the test adapter unit 106 and the munition 102. The ruggedized computer 104 may include any suitable number(s) and type(s) of communication ports 112. In this example, the communication ports 112 include a Personal Computer Memory Card International Association (PCMCIA) port, an RS-232 port, a MIL-STD-1553 port (also referred to as a 1553 port), and possibly other ports. Note, however, that any other or additional ports may be used in a programming and test platform.

The test adapter unit 106 generally represents the component of the programming and test platform that couples the ruggedized computer 104 to the munition 102. In this particular example, the test adapter unit 106 includes a power supply 114 and a processor circuit card assembly 116. The power supply 114 can be used to receive input electrical power from any suitable source and to provide output electrical power to any suitable destination(s). In this example, the power supply 114 receives AC input power, although other forms of power (such as DC power) may also be received. The power supply 114 can also convert the input electrical power into any suitable output electrical power, such as DC power, for use by other components. For instance, the power supply 114 can provide electrical power to the munition 102 and to the ruggedized computer 104. The power supply 114 includes any suitable structure configured to receive and convert electrical power.

The processor circuit card assembly 116 includes one or more processors or other processing devices. For example, the processor circuit card assembly 116 may include one or more processors or other processing devices that execute instructions from the ruggedized computer 104 and that interact with the munition 102. As a particular example, the processor circuit card assembly 116 can execute instructions used to reprogram the munition 102, initiate one or more built-in tests of the munition 102 and read the results, and collect status information from a non-volatile memory of the munition 102. The processor circuit card assembly 116 includes any suitable structure configured to execute instructions and interact with munitions.

As shown in FIG. 2, the software system 200 generally includes a hierarchical arrangement of modules or programs. In the hierarchical arrangement, a software family tree 202 represents the collection of all software and firmware instructions used in the programming or testing of a munition 102. In this example, the software family tree 202 includes an operating system 204, a controller executive CSCI 206, a test adapter unit (TAU) firmware CSCI 208, and munition software 210. The operating system 204 generally represents the operating system supported by the programming and test platform. Any suitable operating system 204 may be used here, such as a WINDOWS XP or other WINDOWS-based operating system, a LINUX-based operating system, or a custom or proprietary operating system.

The controller executive CSCI 206 generally represents the collection of applications or other instructions executed within the operating system 204 by the programming and test platform. The instructions may, for example, be stored in the storage 108 of the ruggedized computer 104 and provided to the processor circuit card assembly 116 via an RS-232 or other communication port 112. In this example, the controller executive CSCI 206 includes an I/O API 212 and one or more device drivers 214. The I/O API 212 enables other components of the programming and test platform to communicate with system interfaces. In some embodiments, the I/O API 212 may be implemented as a software library. The device drivers 214 support interactions with specific types of devices, such as a MIL-STD-1553 interface, TAU interface, other interfaces contained in the MIL-STD-1760 specification, or other interfaces supported by the munition 102. For instance, the MIL-STD-1760 specification defines MIL-STD-704 power connections, MIL-STD-1553 data communications interfaces, high- and low-bandwidth analog signal connections, discrete signal connections, and fiber optic connections (any of which may be virtualized).

The TAU firmware CSCI 208 generally represents the collection of instructions executed by the test adapter unit 106. The munition software 210 includes a munition application (MAP) CSCI 216, which is used to control the behavior of the programming and test platform (such as the CMBRE system) relative to a munition 102. In some embodiments, the MAP CSCI 216 uses the I/O API 212 to control the test adapter unit 106 and to perform desired system functionality, such as built-in testing of the munition 102, reprogramming of the munition 102, and status checking of the munition 102. In many cases, it is the MAP CSCIs 216 that are created by developers for controlling the behavior of the programming and test platform.

Figure 3:
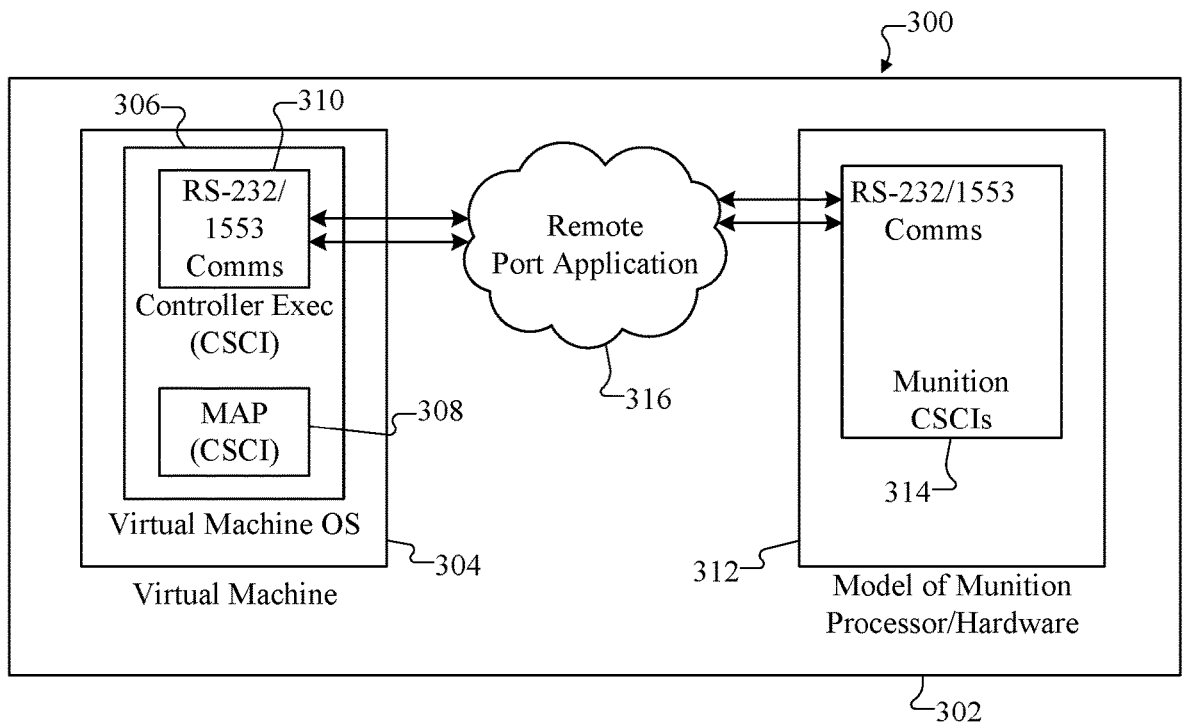
FIG. 3 illustrates a first example virtualization of a munition and a programming and test system according to this disclosure.
Figure 4:
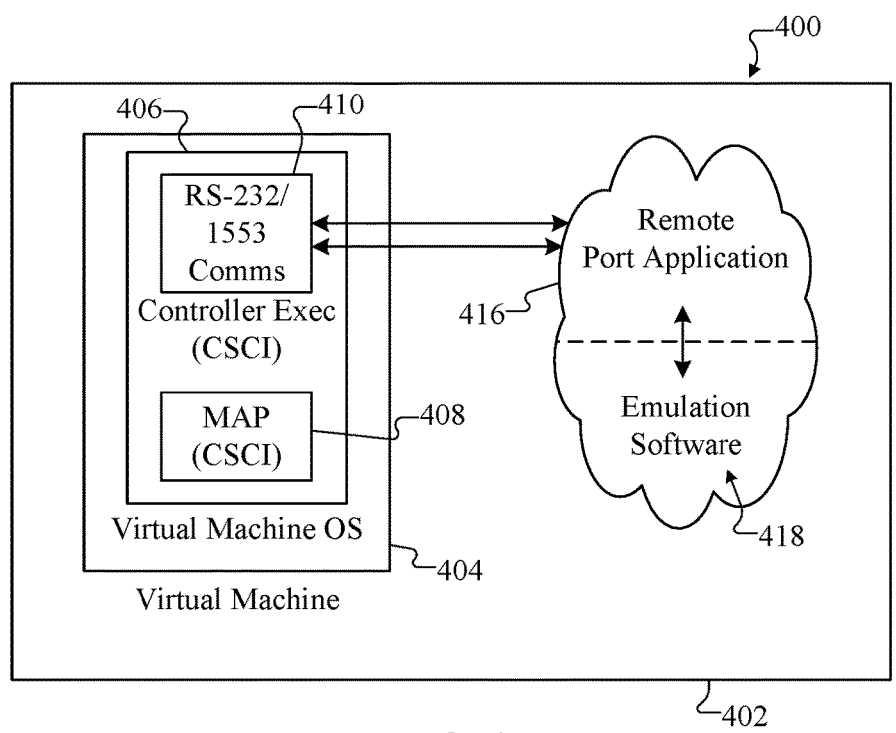
FIG. 4 illustrates a second example virtualization of a munition and a programming and test system according to this disclosure.
Figure 5:
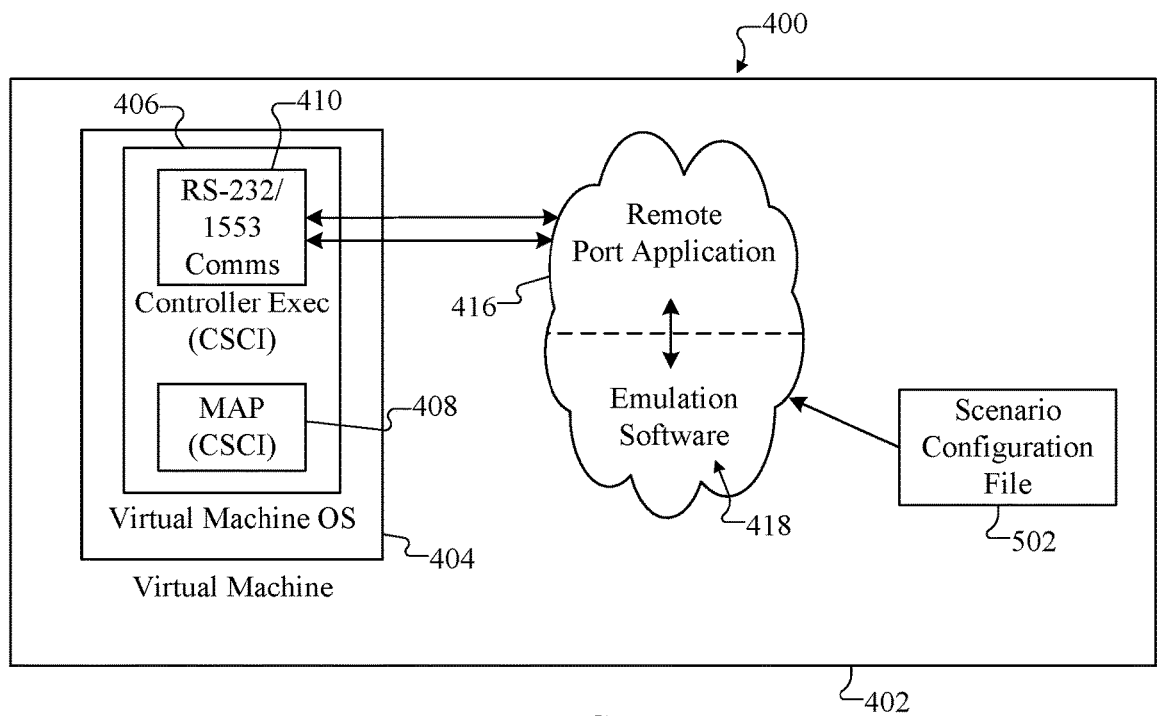
FIG. 5 illustrates an example use of a virtualization of a munition and a programming and test system according to this disclosure.

As can be seen here, under normal circumstances, the ruggedized computer 104 and the test adapter unit 106 need to be obtained and physically coupled to the munition 102 in order to program or test the munition 102. For example, this is typically true when new software (such as a MAP CSCI 216) is being developed and needs to be tested or when new diagnostic tests or built-in tests for the munition 102 (such as a munition CSCI, which is shown in FIGS. 3 through 5) are being developed and need to be tested. Also, under normal circumstances, the ruggedized computer 104 and the test adapter unit 106 need to be obtained and physically coupled to the munition 102 in order to train personnel using the munition 102. For instance, this may allow the operation of the munition 102 to be demonstrated to the personnel. However, as noted above, actually obtaining the ruggedized computer 104 and the test adapter unit 106 may be problematic, such as when the ruggedized computer 104 and the test adapter unit 106 are routinely unavailable. Also, actually obtaining the munition 102 may be problematic, such as when the munition 102 is routinely unavailable or has not yet been designed completely. Further, testing a MAP CSCI's user interface actually requires the user interface to be designed and then loaded into the ruggedized computer 104, and any changes to the user interface at that point may require significant redesign efforts. In addition, testing diagnostic or BIT software or training personnel relative to various faults in the munition 102 may be difficult or impossible, such as when certain faults are rare or difficult to create in the munition 102.

To help with these or other issues, various components of the hardware system 100 and possibly of the munition 102 can be virtualized, and various components of the software system 200 can be executed on a computing device along with the virtualized hardware components. In some cases, the virtualization of the components of the hardware system 100 may occur with 100% or near 100% fidelity, meaning the virtualization of the hardware components functions exactly or almost exactly like the hardware components themselves would function. As a result, this can reduce or eliminate the need to obtain the ruggedized computer 104, test adapter unit 106, and munition 102 and to physically couple the ruggedized computer 104 and the test adapter unit 106 to the munition 102. Among other things, this allows new munition software (including diagnostic tests and built-in tests) to be developed and tested more easily, and this allows training to be conducted more easily. Also, this allows new user interfaces to be demonstrated during the design process so that feedback can be obtained earlier in the process, and this allows testing and training to occur before all aspects of a munition 102 are even designed. In addition, this allows various faults in the munition 102 to be simulated easily, thereby facilitating testing of diagnostic software or built-in tests or facilitating training of personnel even with respect to faults that are rare or difficult to create in the actual munition 102.

Although FIGS. 1 and 2 illustrate one example of a programming and test system used to interact with on-board components of munitions, various changes may be made to FIGS. 1 and 2. For example, the hardware components shown in FIG. 1 and the software components shown in FIG. 2 may be combined, further subdivided, replicated, omitted, or placed in any other suitable arrangement and additional components may be added according to particular needs.

FIG. 3 illustrates a first example virtualization 300 of a munition and a programming and test system according to this disclosure. For ease of explanation, the virtualization 300 shown in FIG. 3 may be described as representing a virtualization of various hardware components used with various software components from the programming and test platform shown in FIGS. 1 and 2. However, the virtualization 300 may include a virtualization of various hardware components used with various software components from any other suitable programming and test platform.

As shown in FIG. 3, the virtualization 300 is provided by a computing device 302, such as a desktop computer, laptop computer, server computer, or tablet computer. The computing device 302 executes or otherwise provides a virtual machine 304, which represents a virtualization of at least part of the hardware in the ruggedized computer 104 and the test adapter unit 106. As a particular example, the virtual machine 304 may represent a virtualization of at least part of the CMBRE platform. Included in the virtual machine 304 is a virtual machine operating system (OS) 306, which represents or includes the operating system 204 normally executed by the ruggedized computer 104. Any suitable virtual machine 304 and any suitable virtual machine operating system 306 may be used here. For example, any number of commercial products (such as from VMWARE, INC.) may be used to support the creation and execution of virtual machines 304 on computing devices. Also, the specific virtual machine operating system 306 may depend on the operating system used in the programming and test platform being emulated, such as a WINDOWS-based, LINUX-based, or custom/proprietary operating system. In some instances, the computing device 302 may include multiple virtual machines 304, such as different virtual machines 304 for different munitions 102 or different programming and test platforms. Also, the multiple virtual machines 304 may support the same virtual machine operating system 306 or different virtual machine operating systems 306.

In this example, multiple CSCIs 308 and 310 are executed within the virtual machine operating system 306. In some embodiments, the CSCIs 308 and 310 may be executed as a single application within the virtual machine operating system 306. In this example, the CSCI 308 represents a MAP CSCI 216 and is used to control the behavior of the emulated programming and test platform, and the CSCI 310 represents a controller executive CSCI 206 (including the components 212-214) for a ruggedized computer 104. Depending on how the virtualization 300 is being used (such as for development or training purposes), the CSCI 308 may represent an existing MAP CSCI 216 previously developed, or the CSCI 308 may represent a MAP CSCI 216 under development to control new features in a munition 102 or the programming and test system. In this example, the CSCI 310 has the ability to communicate over one or more specified types of virtual communication ports, such as RS-232 and MIL-STD-1553 ports. Ideally, the CSCIs 308-310 may execute within the virtual machine operating system 306 in the exact same manner as if they were executed using the ruggedized computer 104 and/or test adapter unit 106.

The virtualization 300 also includes a model 312 of a munition's processor or other hardware. For example, the model 312 may represent a QEMU model or other model of the processor(s) used in a missile or other munition 102 to perform functions such as targeting, launch control, and flight control. In general, the model 312 may include a representation of how the munition's processor or other hardware is designed and operates. For instance, the model 312 may define the numbers and types of processing cores, memories, and interfaces used in the munition 102, as well as connections between those components. The model 312 may also define structures and connections involving any external circuit cards, field programmable gate arrays (FPGAs), or other components on a system bus or otherwise used in the munition 102. The model 312 may further define how these components operate, such as by defining how the processing cores execute instructions and move data and instructions into and out of various memories (such as buffers, registers, caches, and other memories). In some cases, the model 312 may represent another application that is executed by the computing device 302. The model 312 effectively allows munition resources (including processor resources like memory contents and register states) to be inspected at any point during execution or debugging in a virtual environment.

One or more munition CSCIs 314 associated with the munition 102 are executed within or represented by the model 312. The munition CSCIs 314 may represent the software or firmware used for various functions within the munition 102. For example, the munition CSCIs 314 may include the functionality of the Operational Flight Software (OFS) used in a missile or other projectile to control launch and flight of the projectile. In this example, the munition CSCIs 314 have the ability to communicate over one or more specified types of virtual communication ports, such as RS-232 and MIL-STD-1553 ports.

In addition, the virtualization 300 includes a remote port application 316, which provides one or more virtual interfaces between the CSCI 310 in the virtual machine 304 and the model 312 of the munition 102. As a result, the remote port application 316 may represent a virtualized version of the test adapter unit 106, as well as a virtualized version of the port or ports 112 of the ruggedized computer 104 used to communicate with the munition 102. In this example, the remote port application 316 supports a virtual RS-232 interface and a virtual MIL-STD-1553 interface, although any other or additional virtual interfaces may be supported by the remote port application 316. The ability to virtualize the interfaces between the CSCI 310 in the virtual machine 304 and the model 312 representing the munition 102 may enable communication of data between these virtualized components without requiring any modifications to the various CSCIs 308, 310, 314 being executed. In particular embodiments, the remote port application 316 may represent a software library, such as one provided by XILINX, INC. based on the TLM 2.0 protocol.

The ability to virtualize the various hardware components of a munition 102 and its associated programming/test platform enables various actions to occur in a more efficient manner. For example, deliverable MAP software can be developed and tested or production BIT software can be validated without the need for access to actual munition hardware or actual programming/test platform hardware. Also, configurable training scenarios can be created and provided much more easily and effectively, such as by creating specific OFS error conditions or other faults in a munition's hardware. Further, rapid prototyping of user interfaces can be developed and presented to potential users for early validation. In addition, tests can be conducted in a more robust fashion and performed more quickly (such as with a fuzzer or a software test suite) without the need to cycle power on real hardware, which can result in more reliable software since more testing can be conducted in a given time period. These and other functions can be performed since the actual munition software and firmware can be executed within the virtualization 300.

FIG. 4 illustrates a second example virtualization 400 of a munition and a programming and test system according to this disclosure. For ease of explanation, the virtualization 400 shown in FIG. 4 may be described as representing another virtualization of various hardware components used with various software components from the programming and test platform shown in FIGS. 1 and 2. However, the virtualization 400 may include a virtualization of various hardware components used with various software components from any other suitable programming and test platform.

As shown in FIG. 4, the virtualization 400 is provided by a computing device 402 that executes or otherwise provides a virtual machine 404. Included in the virtual machine 404 is a virtual machine operating system 406, and multiple CSCIs 408 and 410 are executed within the virtual machine operating system 406. In some embodiments, these components 402-410 may be the same as or similar to the corresponding components 302-310 in FIG. 3.

This embodiment of the virtualization 400 eliminates the model 312 of the munition's processor or other hardware and the munition CSCIs 314. Instead, a remote port application 416 in the virtualization 400 can be enhanced with or can interact with platform emulation software 418. The platform emulation software 418 can be used to emulate responses or other interactions with a munition 102, thereby allowing interactions with the virtual machine 404. In some embodiments, the remote port application 416 with the platform emulation software 418 can be designed as a dynamic link library (DLL) that can be linked into the CSCI 408. This approach enables MAP CSCI development and training without requiring virtualization of the actual munition hardware, which reduces development time and reduces risks associated with developing munition models.

Although FIGS. 3 and 4 illustrate examples of virtualizations 300, 400 of a programming and test system and possibly a munition, various changes may be made to FIGS. 3 and 4. For example, the virtualized components shown in FIGS. 3 and 4 may be combined, further subdivided, replicated, omitted, or placed in any other suitable arrangement and additional virtualized components may be added according to particular needs.

FIG. 5 illustrates an example use of a virtualization of a munition and a programming and test system according to this disclosure. In this particular example, the virtualization 400 shown in FIG. 4 is being used to support a training scenario. However, the virtualization 400 shown in FIG. 4 may be used in any other suitable manner. Also, the virtualization 300 shown in FIG. 3 or other virtualizations designed in accordance with this disclosure may be used in the training scenario shown here or in other scenarios.

As shown in FIG. 5, at least one configuration file 502 may be used with the platform emulation software 418. Each configuration file 502 provides information used to emulate responses of a munition 102 to a programming/test platform (such as a CMBRE platform) for a different training scenario. As a particular example, each configuration file 502 may provide information used to emulate different faults in the munition 102, including faults that are rare or difficult to create in an actual instance of the munition 102.

Different training scenarios can therefore be presented to users through the use of different configuration files 502. Also, training scenarios can be easily added, removed, or modified through appropriate additions, deletions, or modifications of the configuration files 502. Each configuration file 502 can be created in any suitable manner. For instance, a graphical user interface (GUI) may be used by a trainer to create and manage configuration files 502, configuration files 502 can be created or edited manually, or configuration files 502 can be created or revised in any other suitable manner.

Although FIG. 5 illustrates one example of a use of a virtualization 400 of a munition and a programming and test system, various changes may be made to FIG. 5. For example, the virtualization 400 may be used in any other suitable manner. Also, configuration files 502 may be used with other types of virtualizations involving munitions. In addition, each configuration file 502 may be associated with a single training scenario or multiple training scenarios.

Figure 6:
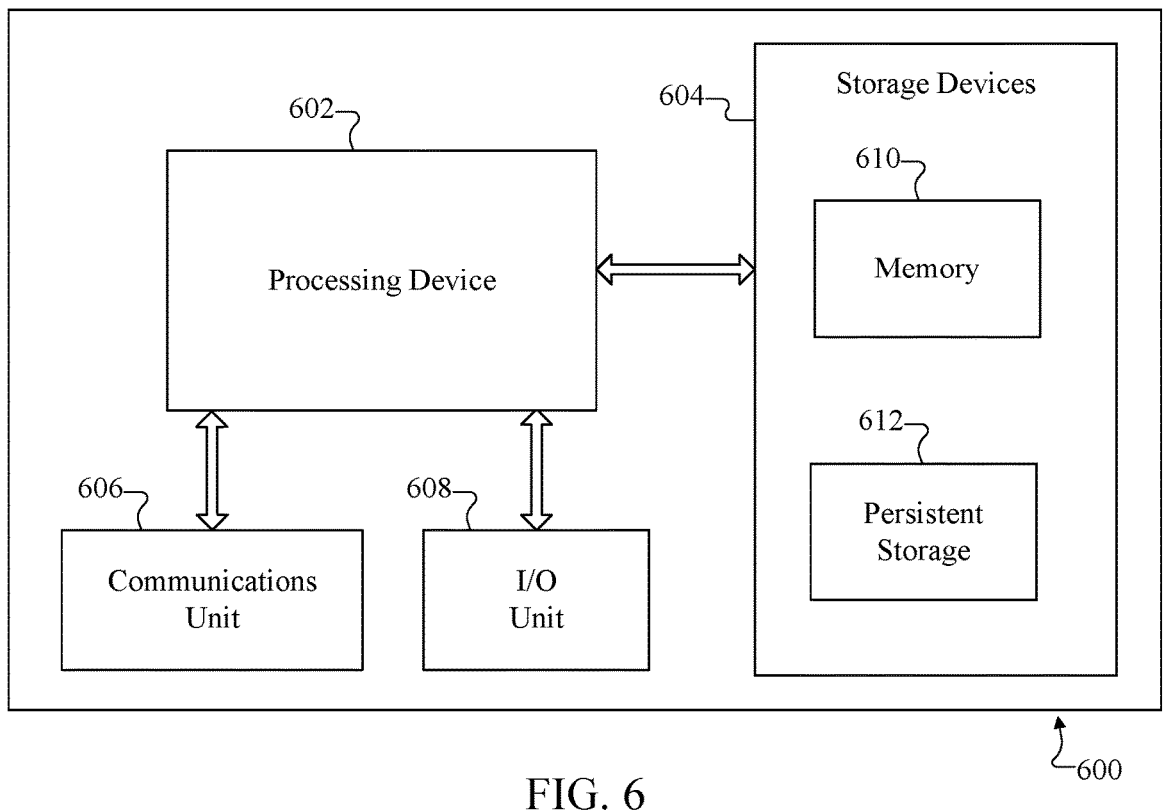
FIG. 6 illustrates an example device supporting use of virtualization of a munition and a programming and test system according to this disclosure.

FIG. 6 illustrates an example device 600 supporting use of virtualization of a munition and a programming and test system according to this disclosure. For example, the device 600 may be used to create, modify, or execute a virtualization of a programming/test platform and optionally of a munition, such as the virtualization 300 or 400. However, virtualizations of munitions and programming/test platforms may be used with any other suitable devices or systems.

As shown in FIG. 6, the device 600 denotes a computing device or system that includes at least one processing device 602, at least one storage device 604, at least one communications unit 606, and at least one input/output (I/O) unit 608. The processing device 602 may execute instructions that can be loaded into a memory 610. The processing device 602 includes any suitable number(s) and type(s) of processors or other processing devices in any suitable arrangement. Example types of processing devices 602 include one or more microprocessors, microcontrollers, digital signal processors (DSPs), application specific integrated circuits (ASICs), field programmable gate arrays (FPGAs), or discrete circuitry.

The memory 610 and a persistent storage 612 are examples of storage devices 604, which represent any structure(s) capable of storing and facilitating retrieval of information (such as data, program code, and/or other suitable information on a temporary or permanent basis). The memory 610 may represent a random access memory or any other suitable volatile or non-volatile storage device(s). The persistent storage 612 may contain one or more components or devices supporting longer-term storage of data, such as a read only memory, hard drive, Flash memory, or optical disc.

The communications unit 606 supports communications with other systems or devices. For example, the communications unit 606 can include a network interface card or a wireless transceiver facilitating communications over a wired or wireless network. The communications unit 606 may support communications through any suitable physical or wireless communication link(s). Note, however, that the communications unit 606 may be omitted if the device 600 does not require network communications.

The I/O unit 608 allows for input and output of data. For example, the I/O unit 608 may provide a connection for user input through a keyboard, mouse, keypad, touchscreen, or other suitable input device. The I/O unit 608 may also send output to a display or other suitable output device. Note, however, that the I/O unit 608 may be omitted if the device 600 does not require local I/O, such as when the device 600 represents a server or other device that can be accessed remotely.

In some embodiments, instructions may be executed by the processing device 602 to implement the various applications, models, and other components of the virtualization 300, 400. Thus, for example, the instructions executed by the processing device 602 may include instructions that emulate the hardware of the programming/test platform, instructions that emulate the hardware or responses of the munition 102, and instructions that form one or more virtual communication channels.

Although FIG. 6 illustrates one example of a device 600 supporting use of virtualization of a munition and a programming and test system, various changes may be made to FIG. 6. For example, computing devices and systems come in a wide variety of configurations, and FIG. 6 does not limit this disclosure to any particular computing device or system.

Figure 7:
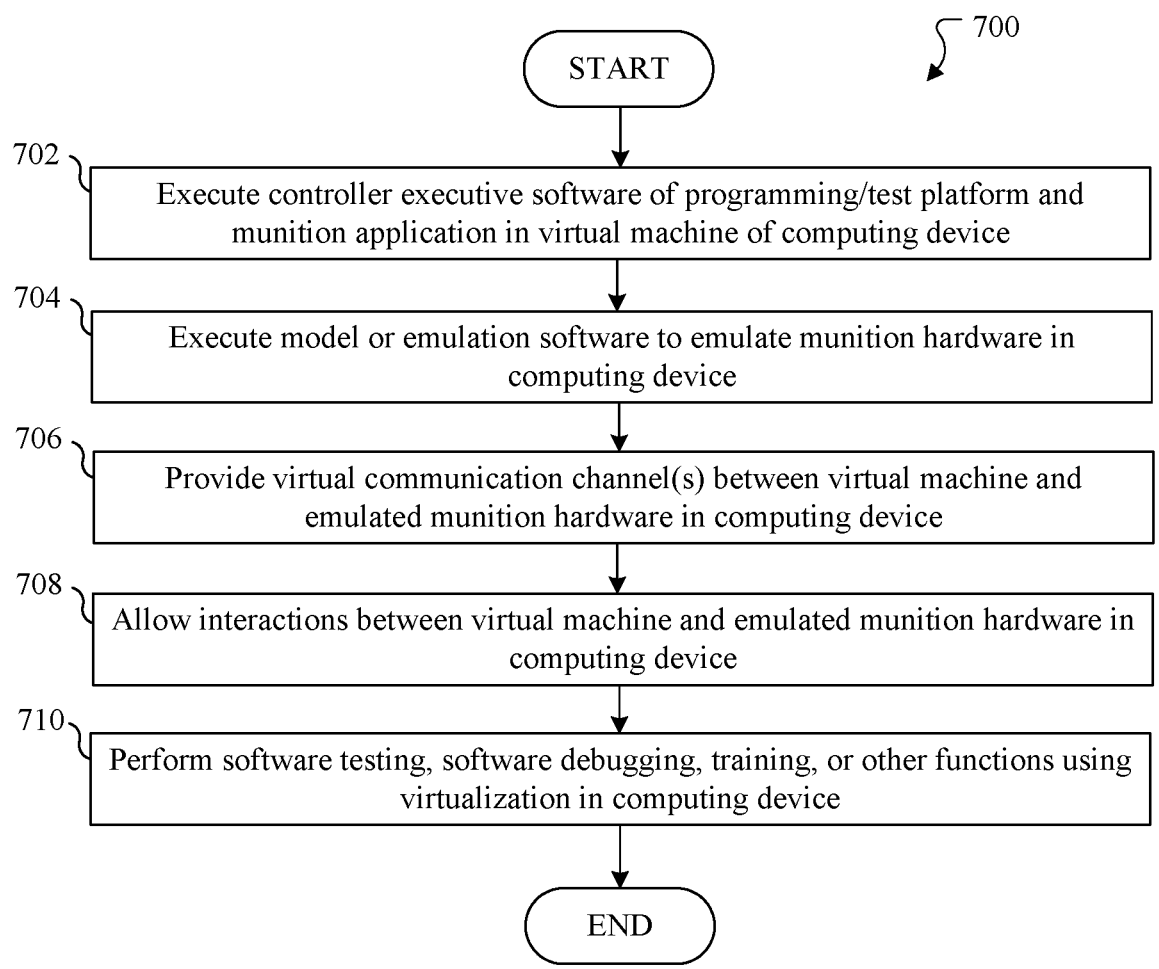
FIG. 7 illustrates an example method for leveraging virtualized hardware with munition support software according to this disclosure.

FIG. 7 illustrates an example method 700 for leveraging virtualized hardware with munition support software according to this disclosure. For ease of explanation, the method 700 may be described as involving the use of the virtualization 300 or 400 of FIG. 3 or 4 to simulate the operation of the hardware and software systems 100 and 200 of FIGS. 1 and 2 with a munition 102. However, the method 700 may involve the use of any other suitable virtualization designed in accordance with this disclosure, which can simulate the operation of any suitable programming/test platform with any suitable munition.

As shown in FIG. 7, controller executive software of a programming/test platform and a munition application are executed in a virtual machine of a computing device at step 702. This may include, for example, the processing device 602 of the computing device 302, 402, 600 executing a virtual machine 304, 404 with a virtual machine operating system 306, 406. This may also include the processing device 602 of the computing device 302, 402, 600 executing a CSCI 308, 408 that represents a MAP CSCI 216. This may further include the processing device 602 of the computing device 302, 402, 600 executing a CSCI 310, 410 that represents a controller executive CSCI 206 (including the components 212-214). In some embodiments, both the CSCI 308, 408 and the CSCI 310, 410 are executed as part of a single application in the virtual machine 304, 404.

A model of munition hardware or emulation software is executed to emulate the munition hardware in the computing device at step 704. This may include, for example, the processing device 602 of the computing device 302, 402, 600 executing a model 312 of a munition's processor or other hardware. This may alternatively include the processing device 602 of the computing device 302, 402, 600 executing platform emulation software 418, which can provide responses or other interactions that emulate the behavior of the munition 102. In general, any suitable virtual representation of the munition 102 may be used here.

One or more virtual communication channels are provided between the virtual machine and the emulated munition hardware in the computing device at step 706. This may include, for example, the processing device 602 of the computing device 302, 402, 600 executing a remote port application 316, 416, which can provide one or more virtual interfaces between the CSCI 310, 410 in the virtual machine 304, 404 and the model 312 or the platform emulation software 418 representing the munition 102. Any suitable virtual communication channel or channels may be used here, such as virtual RS-232 and MIL-STD-1553 channels.

Interactions between the virtual machine and the emulated munition hardware is allowed or supported using the computing device at step 708. This may include, for example, the processing device 602 of the computing device 302, 402, 600 allowing the CSCIs 308-310, 408-410 representing the programming/test platform to interact with the model 312 or the platform emulation software 418 representing the munition 102 as if an actual programming/test platform was coupled to an actual munition 102. This allows any of a number of possible functions to occur, such as software testing, software debugging, or training, at step 710. In some embodiments, this may include the processing device 602 of the computing device 302, 402, 600 executing new software (such as a MAP, diagnostic test, or built-in test) using the emulated munition hardware to verify proper operation of the new software. In other embodiments, this may include the processing device 602 of the computing device 302, 402, 600 simulating the operation of the munition 102 in order to train personnel on how to use, reprogram, or test the munition 102. In various use cases, the processing device 602 of the computing device 302, 402, 600 may use at least one configuration file 502 to simulate one or more faults in the munition 102.

Although FIG. 7 illustrates one example of a method 700 for leveraging virtualized hardware with munition support software, various changes may be made to FIG. 7. For example, while shown as a series of steps, various steps in FIG. 7 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
at least one memory configured to store a virtualization associated with a programming and test platform and a munition, the virtualization including:
a virtual machine containing first software or firmware instructions associated with the programming and test platform and second software or firmware instructions that control behavior of the programming and test platform relative to the munition;
a virtual representation of the munition; and
one or more virtual communication channels configured to communicatively couple the virtual machine and the virtual representation of the munition; and
at least one processor configured to execute the virtualization and simulate the programming and test platform and the munition on the apparatus.

2. The apparatus of claim 1, wherein:
the virtual machine contains a virtual machine operating system that represents an operating system of the programming and test platform; and
the at least one processor is configured to execute the first and second software or firmware instructions within the virtual machine operating system.

3. The apparatus of claim 1, wherein:
the first software or firmware instructions comprise a controller executive Computer Software Configuration Item (CSCI) associated with the programming and test platform; and
the second software or firmware instructions comprise a munition application (MAP) CSCI.

4. The apparatus of claim 1, wherein the virtual representation of the munition comprises a model representing hardware of the munition and operation of the hardware.

5. The apparatus of claim 1, wherein the virtual representation of the munition comprises a software emulation of the munition that is configured to provide simulated responses of the munition.

6. The apparatus of claim 1, wherein the at least one processor is further configured to use a configuration file with the virtual representation of the munition in order to simulate at least one specific fault in the munition.

7. The apparatus of claim 1, wherein the one or more virtual communication channels comprise at least one of: an RS-232 channel, a MIL-STD-1553 channel, and a MIL-STD-1760 channel.

8. A non-transitory computer-readable medium containing instructions that when executed cause at least one processor of a computing device to:
obtain a virtualization associated with a programming and test platform and a munition, the virtualization including:
a virtual machine containing first software or firmware instructions associated with the programming and test platform and second software or firmware instructions that control behavior of the programming and test platform relative to the munition;
a virtual representation of the munition; and
one or more virtual communication channels configured to communicatively couple the virtual machine and the virtual representation of the munition; and
execute the virtualization to simulate the programming and test platform and the munition on the computing device.

9. The non-transitory computer-readable medium of claim 8, wherein:
the virtual machine contains a virtual machine operating system that represents an operating system of the programming and test platform; and
the instructions when executed cause the at least one processor to execute the first and second software or firmware instructions within the virtual machine operating system.

10. The non-transitory computer-readable medium of claim 8, wherein:

the first software or firmware instructions comprise a controller executive Computer Software Configuration Item (CSCI) associated with the programming and test platform; and the second software or firmware instructions comprise a munition application (MAP) CSCI.

11. The non-transitory computer-readable medium of claim 8, wherein the virtual representation of the munition comprises a model representing hardware of the munition and operation of the hardware.

12. The non-transitory computer-readable medium of claim 8, wherein the virtual representation of the munition comprises a software emulation of the munition that is configured to provide simulated responses of the munition.

13. The non-transitory computer-readable medium of claim 8, further containing instructions that when executed cause the at least one processor to use a configuration file with the virtual representation of the munition in order to simulate at least one specific fault in the munition.

14. The non-transitory computer-readable medium of claim 8, wherein the one or more virtual communication channels comprise at least one of: an RS-232 channel, a MIL-STD-1553 channel, and a MIL-STD-1760 channel.

15. A method comprising:
obtaining a virtualization associated with a programming and test platform and a munition, the virtualization including:
a virtual machine containing first software or firmware instructions associated with the programming and test platform and second software or firmware instructions that control behavior of the programming and test platform relative to the munition;
a virtual representation of the munition; and
one or more virtual communication channels configured to communicatively couple the virtual machine and the virtual representation of the munition; and
executing the virtualization to simulate the programming and test platform and the munition.

16. The method of claim 15, wherein:
the virtual machine contains a virtual machine operating system that represents an operating system of the programming and test platform; and
the first and second software or firmware instructions are executed within the virtual machine operating system.

17. The method of claim 15, wherein the virtual representation of the munition comprises one of:
a model representing hardware of the munition and operation of the hardware; and
a software emulation of the munition that is configured to provide simulated responses of the munition.

18. The method of claim 15, further comprising:
using a configuration file with the virtual representation of the munition in order to simulate at least one specific fault in the munition.

19. The method of claim 15, further comprising:
using the simulated programming and test platform and the simulated munition to test at least one of a munition application, a diagnostic test, and a built-in test for the munition.

20. The method of claim 15, further comprising:
using the simulated programming and test platform and the simulated munition to train personnel how to use the programming and test platform or the munition.

\* \* \* \* \*